United States Patent [19]

Jameson et al.

[11] 4,358,370

[45] Nov. 9, 1982

[54] BACKWASHABLE FILTER

[75] Inventors: Dennis E. Jameson, Carlisle; David O. Richards, Wigton, both of England

[73] Assignee: British Sidac Limited, Watford, England

[21] Appl. No.: 251,699

[22] Filed: Apr. 7, 1981

[30] Foreign Application Priority Data

Apr. 22, 1980 [GB] United Kingdom ............... 8013225

[51] Int. Cl.³ ............................................... B01D 29/38
[52] U.S. Cl. ................................... 210/415; 210/498; 210/485
[58] Field of Search ............................ 210/413–415, 210/437, 445, 446, 453, 455, 484, 485, 497.1, 497.01, 498, 499

[56] References Cited

U.S. PATENT DOCUMENTS

| | | | |
|---|---|---|---|
| 2,910,183 | 10/1959 | Hayes | 210/498 X |
| 3,016,984 | 1/1962 | Getzin | 210/497.01 X |
| 3,511,374 | 5/1970 | Beal | 210/415 X |
| 3,574,509 | 4/1971 | Zentis et al. | 210/415 X |
| 3,840,123 | 10/1974 | McClure | 210/415 X |
| 4,178,246 | 12/1979 | Klein | 210/415 X |

*Primary Examiner*—Thomas G. Wyse

[57] ABSTRACT

A backwashable filter comprises a generally cylindrical housing with an inlet and an outlet, a cylindrical filter basket located within the housing between the inlet and the outlet, and a backwashing arm bearing against the inside face of the filter basket and arranged to rotate about the axis of the filter basket. The filter basket is formed by an inner and outer perforated cage with a filter medium interposed between them. The outer surface of the inner cage is configured to provide channelling between the inner cage and the filter medium to allow liquid to be filtered to contact substantially all of the inner surface of the filter medium. Direct flow of liquid to be filtered from the inside of the inner cage into the backwashing arm along the channelling is prevented by arranging the channelling axially or by arranging the channelling in the circumferential direction and then providing a wide shoe on the backwashing arm.

15 Claims, 8 Drawing Figures

BACKWASHABLE FILTER

This invention relates to backwashable filters and, in particular, to backwashable filters capable of use in the filtration of viscose and other viscous liquids.

Backwashable filters have been used for filtering a variety of materials but they have found particular use in the filtration of viscose before it is extruded to form regenerated cellulose film or regenerated cellulose fiber. British Patent Specification No. 1,111,914 describes the general construction and use of such a filter and its application to the filtration of viscose. This specification shows a filter having a generally cylindrical housing with an inlet opening into the center of the housing and an outlet opening from the outside periphery of the housing. A cylindrical filter basket is located coaxially within the housing and arranged between the inlet and the outlet, and a backwashing arm is rotatably mounted about the central axis of the housing and bears against the inside face of the filter basket. In use, the liquid to be filtered is forced into the inside of the filter basket and then the filtered liquid passes out through the filter basket into the space between the outside of the basket and the housing and then through the outlet. Debris filtered from the liquid is trapped in the filter basket. The backwashing arm is hollow and the part which bears against the inner face of the filter basket includes an elongated slot extending parallel to the axis of the housing. In use, the pressure inside the backwashing arm is less than the pressure in the space between the outside of the filter basket and the inside of the housing and therefore, as the backwashing arm is rotated against the inside face of the filter basket, some of the filtered liquid flows in the reverse direction through the filter basket and into the backwashing arm. In its reverse flow through the filter basket, the filtered liquid carries with it the debris which has been trapped in the filter basket and so, as the backwashing arm is rotated, it continually backwashes the filter basket at the same time as the majority of the filter basket is being used for filtration.

This type of filter has met with considerable success but, in spite of that, it does possess several disadvantages which are particularly marked when it is used to filter viscose or other viscous liquids. The filter basket includes an inner and an outer cage between which the filter medium is located. In the past, the filter medium has usually been formed by a woven stainless steel wirecloth. The outer perforated cage is formed in two halves. It is important that the perforations in both the inner and the outer cages are aligned with one another so that the liquid to be filtered can pass through the filter basket. The way that the filter basket is prepared and the way that the alignment is achieved is described fully in British Specification No. 1,111,914.

When the inner and outer cages are perforated together in a single operation as disclosed in specification No. 1,111,914, this is a relatively awkward operation to perform using conventional machine tools in view of the relatively large size of the cylindrical filter baskets and the large number of perforations which have to be machined into the cages, and it is impossible to increase the area of voids through the inner cage to an area greater than about 40% of the surface area of the inner cage without weakening the inner cage unduly. Thus, only 40% of the area of the filter medium is used in such filters and this means that over half of the filter medium is wasted. This leads to the filter having to be twice as large as necessary or it only having half its potential maximum output.

In other types of filter it is known to increase the usable area of a filter medium by including grooves in a housing supporting the filter medium. One example of such a device is shown in West German Patent Specification No. 257 144 which shows a filter for installation immediately upstream of a spinneret for the extrusion of viscose. The general application of similar techniques to a backwashable filter would not be successful because the liquid to be filtered would simply be drawn along the grooves in the housing or cage on the upstream side of the filter medium from the inside of the filter basket directly into the backwashing arm. Not only would this lead to a considerable wastage of liquid but, since the flow into the backwashing arm comes from inside the filter basket, there would be little or no reverse flow through the filter medium to carry away the debris collected in the filter medium.

According to this invention, a backwashable filter comprises a generally cylindrical housing with an inlet opening into the housing and an outlet opening from the housing, a cylindrical filter basket within the housing and interposed between the inlet and the outlet, a backwashing arm bearing against the inside of the filter basket and being rotatable about the axis of the filter basket, the filter basket comprising an inner and an outer perforated cage with a filter medium interposed between them, the outer surface of the inner cage being configured to provide channelling between the inner cage and the filter medium to allow the liquid to be filtered to contact substantially all of the inner surface of the filter medium, and means to prevent direct flow of the liquid to be filtered from the inside of the filter basket into the backwashing arm.

By configuring the outer surface of the inner cage of a backwashable filter so that it includes channelling and, in addition, providing means to prevent the direct flow of the liquid to be filtered from the inside of the filter basket into the backwashing arm, it is possible to use substantially the entire filter medium for filtration. Moreover, the provision of channelling on the outer surface of the inner cage removes the need for the perforations in the inner and outer cages to be strictly aligned. This greatly facilitates the construction and assembly of a filter basket for a backwashable filter.

The filter in accordance with this invention is particularly beneficial when used with an in-depth filter medium formed by, for example, a sintered fleece of stainless steel fibers. With such an in-depth filter medium, debris is trapped throughout the thickness of the filter medium as well as on its surface, and it has a greater dirt holding capacity. It is also possible to provide a sandwich formed by a number of different layers of in-depth filter medium one on top of the other and so, increase the degree of fineness of filtration which can be achieved by the filter, without limiting its output unduly. When the filter medium includes a number of layers of different porosity, the larger particles of debris tend to get trapped in the more porous layers whereas finer particles of debris pass through the more porous layers and are only trapped in the downstream, less porous layers. This means that the downstream, less porous layers are not clogged prematurely by large particles of debris. The particular construction of the filter medium can thus be varied to suit a particular material which is to be filtered.

The filter in accordance with this invention is especially beneficial when it is also made in accordance with the invention described and claimed in our co-pending patent application Ser. No. 251,802 which was filed on the same day as this application and which claims priority from United Kingdom Patent Application No. 8013158. This co-pending application describes and claims a backwashable filter including a filter basket comprising a perforated core or inner cage, a filter medium wrapped around the perforated core or inner cage, and a perforated flexible outer clamping band wrapped around the outside of the filter medium with tensioning means to apply tension to the clamping band and thereby clamp the filter medium tightly against the perforated core or inner cage. This particular construction of the filter basket clamps the filter medium tightly against the inner cage to prevent the filter medium from flexing during backwashing. A side effect of this tight clamping is that access to the filter medium is reduced to a greater extent than with the conventional backwashing filter but, when it is used in combination with the present invention, this side effect is overcome. Also, because the filter medium is wrapped around the perforated core and clamped tightly in position, it is possible to obtain a much tighter seal at the top and bottom ends of the filter medium and along the axial joint in the filter medium and hence reduce the leakage of unfiltered liquid around the edges of the filter medium. Preferably the filter also includes a pair of clamping rings adjacent the top and bottom edges of the filter and arranged to clamp the top and bottom edges of the filter medium tightly against the outside surface of the inner perforated core or cage, to ensure that an effective seal is formed around the ends of the filter medium.

Preferably the outer surface of the inner cage includes a series of axially extending grooves with the perforations through the cage being located in the base of the grooves. With the inner cage being configured in this way, there is substantially no cross-flow of unfiltered material from the inside of the filter basket into the backwashing arm as the arm is rotated. Since the slot in the backwashing arm extends vertically and, at any moment is only in communication with one column of perforations in any one groove in the outer surface of the inner cage. Ribs remaining between adjacent grooves prevent communication between adjacent grooves and, in this example form the means preventing the direct flow of liquid to be filtered between the inside of the filter basket and the backwashing arm. The axially extending grooves stop before the top and bottom ends of the inner cage to prevent leakage around the top and bottom ends of the inner cage. This configuration is particularly preferred when it is used in combination with a clamping band formed by a lattice work including circumferentially extending rings adjacent the filter medium supported on their outside by axially extending rods.

The outer surface of the inner cage may have circumferentially extending grooves cut into it or the grooves may be arranged in two different directions to form a criss-cross pattern. Preferably the circumferentially extending grooves are formed by a single helical groove cut into the outer surface of the cylindrical drum.

Two sets of grooves may be cut in the outer surface of the inner cage, the two sets of grooves being of opposite hand so that the two sets of grooves criss-cross one another. The channelling may also be provided by wrapping the outer surface of the drum with one or more filaments, for example by wrapping the outer surface of the drum with a helical filamentary winding.

When the outer surface of the inner cage includes grooves extending in the circumferential direction, the means to prevent the direct flow of liquid to be filtered from the inside of the filter basket into the backwashing arm includes portions which extend in the circumferential direction of the filter basket on both sides of the slot in the backwashing arm for at least three times the pitch of the perforations in the inner cage in the circumferential direction of the filter basket. In this way, these portions of the backwashing arm provide an effective seal against at least three sets of perforations on each side of the aperture being backwashed at any particular instant and this has been found to substantially eliminate the amount of unfiltered material that is drawn into the backwashing arm by passage along the circumferentially extending channels formed between the outer surface of the inner cage and the filter medium. The portions extending on each side on the slot of the backwashing arm preferably cover four apertures on each side of the slot.

In the past, with conventional filter baskets such as those manufactured in accordance with British Patent Specification No. 1,111,914, the debris has built up on the inner surface of the filter medium in the areas of the perforations on the inner cage. To use as great a surface area as possible of the filter, the perforations in the inner cage have been made as large as possible. For the inner cage of the filter basket to be stable so that it does not distort in use and so that the clearance between the backwashing arm and the inner cage remains constant, the thickness of the inner cage is very much greater than the build up of the debris on the inner surface of the filter medium. Therefore, when the thickness of the debris is much less than the thickness of the inner cage, a relatively large quantity of liquid is removed during the backwashing of the filter as well as the debris and this increases the volume of the reject removed through the backwashing arm. By providing channels between the outer face of the inner cage and the inner face of the filter medium, the cross-sectional areas of the apertures through the inner cage are able to be reduced without reducing the usable cross-sectional area of the filter medium. Thus, with the filter in accordance with this invention, the ratio of debris to liquid being removed through the backwashing arm is very much higher so that there is a considerably smaller volume of reject removed through the backwashing arm by a filter in accordance with this invention.

Various examples of a filter in accordance with this invention will now be described with reference to the accompanying drawings; in which.

In all of these examples the basic construction of the filter is substantially the same as that shown in British Patent Specification No. 1,111,914 with the exception of the construction of the filter basket and backwashing arm. Consequently, only the construction of the filter basket and backwashing arm will be described in detail.

Figure 1:
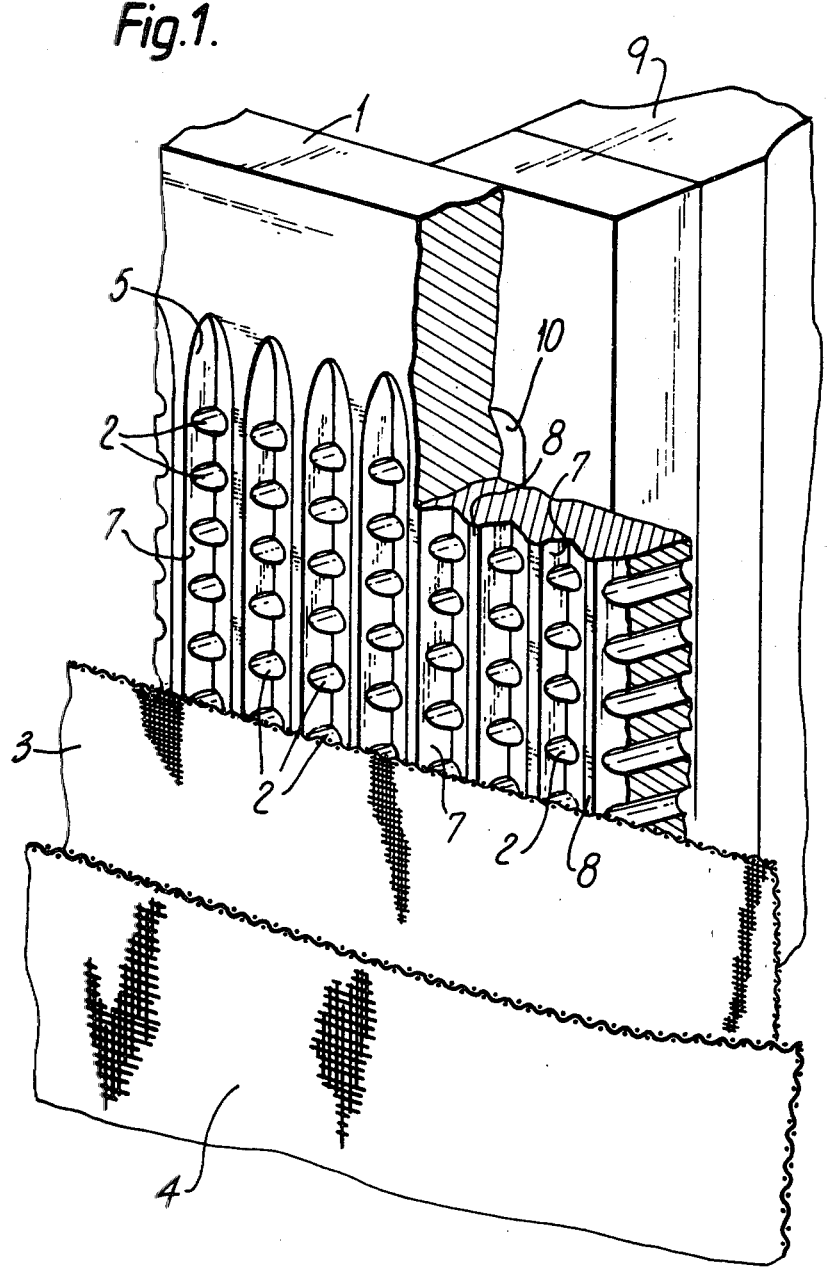
FIG. 1 is a perspective view of a part of the filter showing the backwashing arm, the inner cage, the filter medium and the outer cage of a first example.
Figure 2:
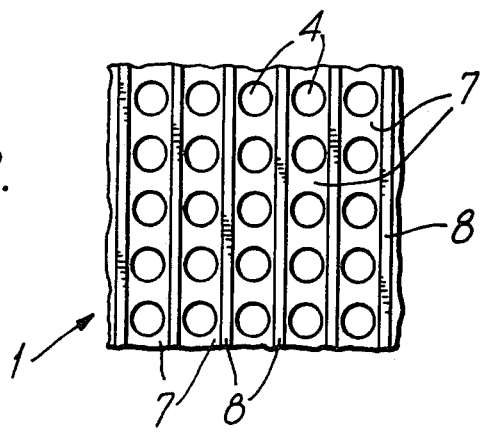
FIG. 2 is a front elevation of a part of the inner cage in a second example.
Figure 3:
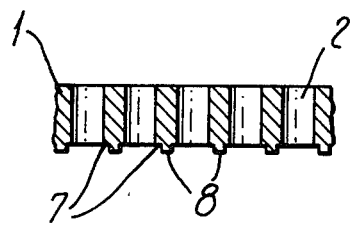
FIG. 3 is a radial section through a fragment of the inner cage of the second example.
Figure 4:
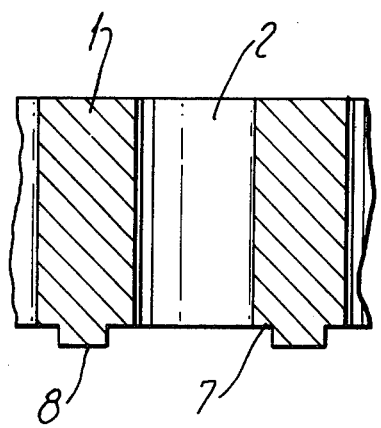
FIG. 4 is a radial section to a larger scale of the inner cage of the second example.
Figure 5:
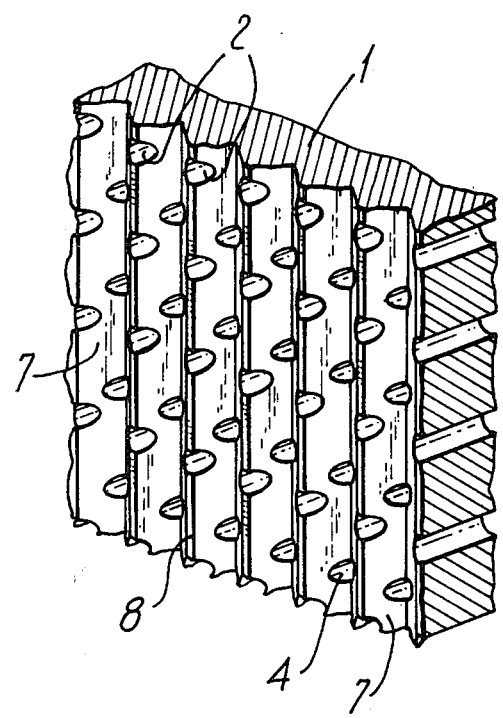
FIG. 5 is a perspective view of the inner cage of a third example.
Figure 6:
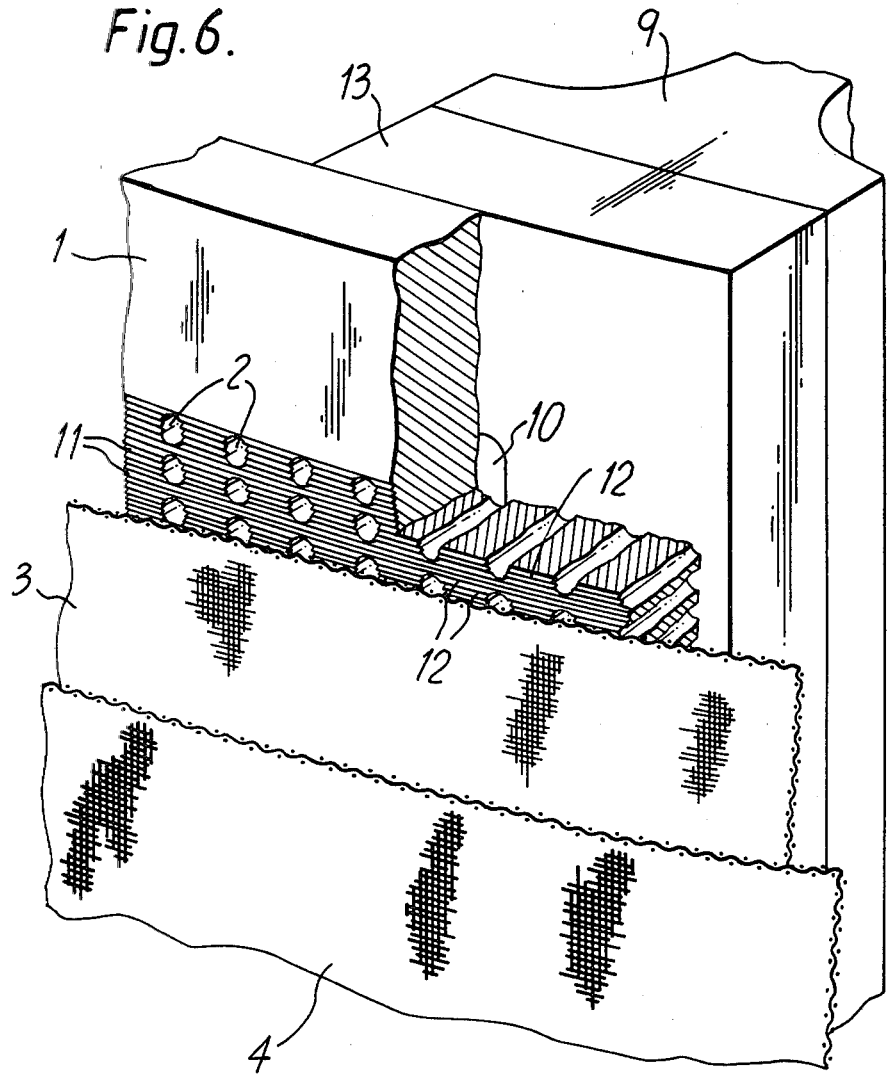
FIG. 6 is a perspective view of part of the filter showing the backwashing arm, the inner cage, the filter medium and the outer cage of a fourth example.
Figure 7:
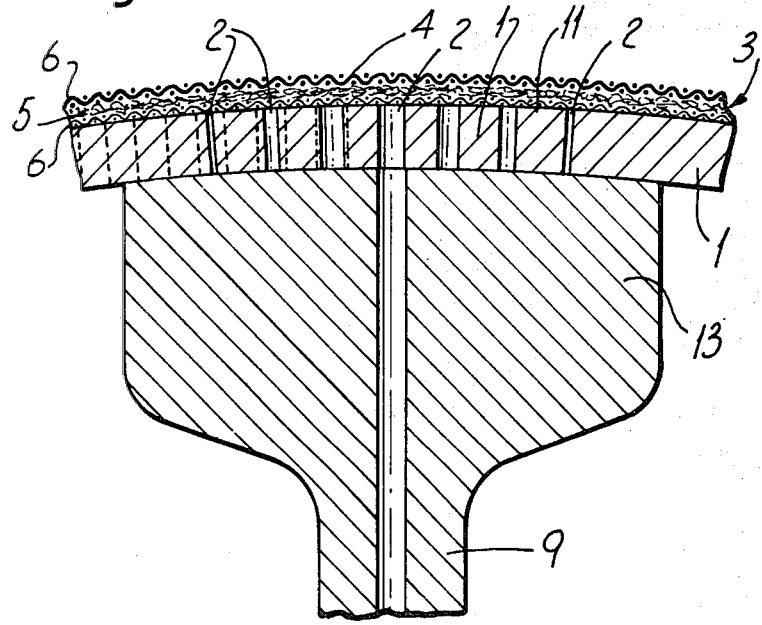
FIG. 7 is a radial section through a fourth example of filter.

The filter basket of all of the examples includes a cylindrical perforated core or inner cage 1 having a number of holes 2 therethrough. The cage 1 has a filter medium 3 wrapped around it and this is surrounded by an outer clamping band 4 formed from a wire mesh and/or from a lattice work. The general construction of the outer clamping band may have one of the forms described and illustrated in our co-pending application referred to above and hence its construction will not be described in detail. The filter medium comprises a fleece of sintered stainless steel fibers 5 which has a woven wire mesh 6 on its opposite faces as shown in FIG. 7. In FIGS. 1 and 6 the filter medium 3 is shown as a simple wirecloth for clarity. The woven wire meshes provide some mechanical strength for the sintered fiber fleece.

In the first exaple, the perforated core or inner cage 1 is cylindrical and includes the holes 2 arranged in columns aligned with the axis of the cylinder. The outer surface of the inner cage 1 also includes a number of V-sectioned grooves 7 again extending parallel to the axis of the drum with each of the grooves 7 being aligned with a column of the holes 2. Typically, the holes 2 have a diameter of about 2 mm and are spaced at a pitch of 9 mm while the width of a rib 8 formed by the remaining outer surface of the inner cage 1 between adjacent grooves 7 is typically about 1 mm.

The top and bottom ends of the inner cage 1 are unperforated, and the grooves 7 are terminated so as not to be entered to the top and bottom end edges to leave the outer surface of the inner cage 1 adjacent its top and bottom ends as a plain cylindrical band. The backwashing arm 9 includes an axial slot 10 and is arranged to abut the inner surface of the inner cage 1. As the backwashing arm 9 rotates, its slot 10 is aligned with successive columns of the holes 2.

The second example is generally similar to the firxt except that the grooves 7 in the outer face of the perforated core or inner cage are formed as flat bottomed grooves. In both the first and second examples, the ribs 8 isolate the individual columns of holes 2 so that, upon the slot 10 in the backwashing arm 9 being aligned with a particular column of holes 2, the liquid drawn into the slot 10 in the arm 9 is drawn in reverse flow through the filter medium 3. The ribs 8 prevent the unfiltered liquid from an adjacent groove 7 and column of holes from being drawn into the backwashing arm 9.

The third example, best seen in FIG. 6, is generally similar to the first example except that the holes 2 are formed in a staggered array. In this case it is possible for some cross-flow to take place between adjacent grooves 7 through the holes bridging the ribs 8 between adjacent grooves 7. However, when this is used in conjunction with the backwashing arm used in the fourth and fifth examples it is perfectly satisfactory. The backwashing arm will be described subsequently.

The fourth example includes grooves 11 which extend in the circumferential direction. The grooves 11 may be formed by separate axially spaced grooves but preferably they are formed by adjacent turns of a single helical groove. The grooves 11 are once again separated by a rib 12 formed by the remaining portions of the outer surface of the inner cage 1. As in the first example a band at the top and bottom of the cage 1 is not perforated with the holes 2 and does not include the grooves 11. In this example to prevent unfiltered liquid being drawn along the grooves 12 directly from the inside of the cage into the slot 10 in the backwashing arm 9, the backwashing arm 9 includes an enlarged shoe 13. The shoe 13 extends in the circumferential direction a distance approximately equal to four times the pitch of the holes 2 on both sides of the slot 10. Therefore, at any instant during its rotation, the shoe 13 obscures and forms a seal against the four holes 2 on each side of the ones adjacent the slot 10. When the liquid to be filtered is a viscous liquid like viscose, the shoe 13 may only cover three holes on each side of the slot 10 and it may be desirable to increase the width of the shoe 13 when the liquid to be filtered is less viscous.

Figure 8:
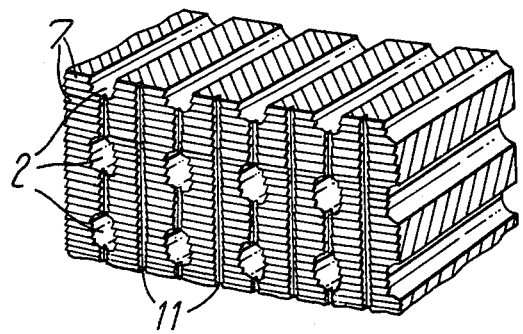
FIG. 8 is a perspective view of the inner cage of a fifth example.

The fifth example, shown in FIG. 8, includes both circumferentially extending grooves 11 and axially extending grooves 7. Again in this example it is necessary to use a backwashing arm 9 with a wide shoe 13 to prevent the direct flow of unfiltered liquid along the circumferentially extending grooves 11. It is also possible to cut two sets of grooves generally perpendicular to each other, each set describing a generally helical path around the outside of the inner cage 1 with the two sets being of opposite hand. In this case the two sets of grooves are each inclined to the axis of the cage 1 at approximately 45°.

We claim:

1. In a backwashable filter comprising a generally cylindrical housing with an inlet opening into said housing and an outlet opening from said housing, a cylindrical filter basket within said housing and interposed between said inlet and said outlet, a backwashing arm bearing against the inside of said filter basket and being rotatable about an axis of said filter basket, the improvement wherein said filter basket comprises:
   an inner and an outer perforated cage;
   a filter medium interposed between said inner and outer cage;
   an outer surface of said inner cage having channels to allow liquid to be filtered to contact substantially all of an inner surface of said filter medium; and
   means to prevent direct flow of said liquid to be filtered from inside of said inner cage into said backwashing arm.

2. The filter of claim 1, wherein said filter medium is an in-depth filter medium capable of trapping particles filtered out of said liquid throughout a thickness of said filter medium.

3. The filter of claim 2, wherein said medium comprises a sintered fleece of stainless steel fibers.

4. The filter of claim 2, wherein said filter medium has a varying porosity throughout said thickness thereof, said varying porosity being finest at an outer peripheral surface of said filter medium closest to an inner surface of said outer perforated cage and being coarsest at said inner surface of said filter medium.

5. The filter of claim 4 wherein said filter medium comprises a plurality of layers sandwiched together, each layer being capable of trapping said particles filtered throughout a thickness of said layer, each inner layer being coarser than an adjacent outer layer in contact therewith.

6. The filter of claim 1, wherein said outer perforated cage comprises a perforated flexible clamping band, and tensioning means to apply tension to said clamping band to clamp said filter medium tightly against said inner cage.

7. The filter of claim 6, wherein said clamping band includes a lattice support, said lattice support comprising a plurality of parallel circumferentially extending rings, and a plurality of axially extending rods connected to an outside surface of the said rings.

8. The filter of claim 6, wherein said clamping band includes a lattice support, said lattice support comprising a plurality of substantially straight axially extending rods and a plurality of spaced circumferentially extending bands connected to an outside surface of said rods.

9. The filter of claim 1, wherein said channels comprise a series of axially extending grooves formed in said outer surface of said inner cage said perforations in said inner cage being aligned with said axially extending grooves, said means to prevent direct flow of said liquid to be filtered from inside said inner cage into said backwashing arm comprising ribs formed on said outer surface of said inner cage, said ribs being between said adjacent axially extending grooves.

10. The filter of claim 9, wherein said axially extending grooves terminate before reaching top and bottom ends of said inner cage to prevent leakage of liquid to be filtered around top and bottom ends of said filter medium.

11. The filter of claim 1, wherein said channels comprise a series of grooves extending in a circumferential direction in said outer surface of said inner cage.

12. The filter of claim 1, wherein said channels comprise at least one helical groove cut into said outer surface of said inner cage to provide channelling between said inner cage and said filter medium.

13. The filter of claim 1, wherein said channels comprise grooves arranged in two different directions formed in said outer surface of said inner cage, said differently directed grooves forming a criss-cross pattern of grooves to provide channelling on said outer surface of said inner cage.

14. The filter of claim 13, wherein said differently directed grooves comprise two sets of helical grooves cut in said outer surface of said inner cage, said two sets of helical grooves being of opposite hand whereby said two sets of helical grooves criss-cross one another to provide channelling.

15. The filter of any one of claims 11 to 14, wherein said means to prevent said direct flow of said liquid to be filtered from inside of said inner cage into said backwashing arm includes a backwashing arm having a slot therein and also having an enlarged shoe having portions which extend in the circumferential direction of said filter basket on both sides of said slot, each portion of said shoe extending a distance in said circumferential direction of said filter basket which is at least three times a pitch distance of said perforations in said inner cage.

* * * * *